(12) United States Patent
Hadad et al.

(10) Patent No.: US 12,355,518 B2
(45) Date of Patent: Jul. 8, 2025

(54) AI (ARTIFICIAL INTELEGENCE) MIMO (MULTIPLE INPUT MULTIPLE OUTPUT) DETECTOR

(71) Applicant: RUNCOM Communication Ltd., Rishon Lezion (IL)

(72) Inventors: Zion Hadad, Rishon Lezion (IL); Eli Shasha, Rishon Lezion (IL); Baruch Globen, Rishon Lezion (IL)

(73) Assignee: RUNCOM Communication Ltd., Rishon Lezion (IL)

( * ) Notice: Subject to any disclaimer, the term of this patent is extended or adjusted under 35 U.S.C. 154(b) by 24 days.

(21) Appl. No.: 18/092,358

(22) Filed: Jan. 2, 2023

(65) Prior Publication Data

US 2024/0223242 A1 Jul. 4, 2024

(51) Int. Cl.
*H04L 5/12* (2006.01)
*H04B 7/0426* (2017.01)
*H04B 7/0456* (2017.01)

(52) U.S. Cl.
CPC ........... *H04B 7/043* (2013.01); *H04B 7/0456* (2013.01)

(58) Field of Classification Search
CPC .............................. H04B 7/043; H04B 7/0456
USPC ........................................................ 375/262
See application file for complete search history.

(56) References Cited

U.S. PATENT DOCUMENTS

| 2011/0069785 | A1* | 3/2011 | Ezri | H04L 25/03242 375/316 |
| 2011/0188615 | A1* | 8/2011 | Yang | H04L 27/06 375/341 |
| 2018/0357530 | A1* | 12/2018 | Beery | H04L 1/0045 |

FOREIGN PATENT DOCUMENTS

| CN | 112290954 | * | 1/2021 |
| GB | 2458528 | * | 9/2009 |

* cited by examiner

*Primary Examiner* — Helene E Tayong
(74) *Attorney, Agent, or Firm* — Rivka Friedman

(57) ABSTRACT

The subject matter discloses an AI (Artificial intelligent) MIMO (Multiple INPUT Multiple Output) radio channel data detector which includes QR decomposition preprocessing of the channel matrix (H) and providing related LLR results to enable the close to optimal data detection.

5 Claims, 3 Drawing Sheets

AI (ARTIFICIAL INTELEGENCE) MIMO (MULTIPLE INPUT MULTIPLE OUTPUT) DETECTOR

FIELD OF THE INVENTION

The present disclosure relates to telecommunication systems in general, and to MIMO (Multiple Input Multiple Output), in particular.

BACKGROUND OF THE INVENTION

MIMO (Multiple Input Multiple Output) wireless technology turns radio multi-path propagation and delay spread to extend radio channel performance. With MIMO channel capacity and resilience are improved with no need for extra bandwidth. MIMO implementation requires extensive software and hardware processing complexity needed at both ends of the radio channel, at the transmitter and at the receiver.

MIMO Model—The radio channel formula is given by:

$$Y=H*X+n$$

where:
X—is a vector of transmitted data
H—is the wireless channel transfer function given by a matrix of complex elements, herein after channel matrix.
n—is additive noise
Y—is the received vector, which is the transmitted data as received by the receiver.

Typically, the model requires that length of y (n-Rx-Antennas) is >=length of x (n-Tx-Antennas)

$$\text{Rank of } H \text{>=length of } x$$

MIMO detectors reveal the transmitted data streams out of the received signals based on the MIMO model. The detector searches over a full set of possible outcomes. Such a search requires heavy processing.

Massive MIMO includes 10's to 100's of antennas and requires extensive processing to detect the transmitted data streams.

To reduce the MIMO detectors computational complexity, near optimal algorithms are used. Such algorithms include:
Zero Forcing (ZF)
Minimum Mean-Square Error (MMSE)
Successive Interference Cancellation (SIC).

Some of the MIMO detectors are implemented with deep neural network technology.

SUMMARY OF THE INVENTION

The term computing device refers herein to a device that includes a processing unit. Examples of such devices are a personal computer, a laptop, a server, a wearable device, a tablet, a cellular device and IoT (Internet of Things) devices.

The term OR Decomposition refers herein to a decomposition of a matrix A into a product A=Q*R of a unitary matrix Q and an upper triangular matrix R.

The terms upper triangular matrix R and R matrix are used herein interchangeably.

The term LLR refers herein to the Log-Likelihood Ratio algorithm for calculating the likelihood value, 0 or 1, of a bit in the received data vector for identifying 0 or 1.

The term A refers herein to the detected data vector.

One exemplary embodiment of the disclosed subject matter is a method for training a deep neural network, the method comprising: receiving a plurality of complex data vectors (Y) and a plurality of MIMO-channel-transfer-matrixes-H, each complex data vector (Y) of the plurality of complex data vectors (Y) being associated with a MIMO-channel-transfer-matrix-H of the plurality of MIMO-channel-transfer-matrixes-H, each the MIMO-channel-transfer-matrix-H being associated with a certain MIMO channel; decomposing each of the MIMO-channel-transfer-matrixes-H into a Q matrix and an R matrix; transposing the Q matrix into $Q^T$; multiplying each of the $Q^T$ by an associated vector (Y) to thereby providing $Q^T*Y$; training the deep neural network with a training set labeled with LLR values to, thereby, utilizing the deep neural network for detecting $\hat{X}$; the training set comprising the plurality of the $Q^T*Y$ and the associated upper part of R matrix. According to some embodiments, wherein each of the LLR values being generated by a maximum likelihood detector. According to some embodiments the method further comprising: as a result of the training utilizing the deep neural network for obtaining second LLR values from a second complex data vector (Y) and a second associated MIMO channel-transfer-matrix-H; the second associated MIMO channel transfer matrix H being generated by a MIMO channel estimator. According to some embodiments the second LLR values being utilized for the detecting the $\hat{X}$.

One other exemplary embodiment of the disclosed subject matter A method, the method comprising: receiving a complex data vector (Y) and a MIMO-channel-transfer-matrix-H, the complex data vector (Y) being associated with a MIMO-channel-transfer-matrix-H, the MIMO-channel-transfer-matrix-H being associated with a certain MIMO channel; decomposing the MIMO-channel-transfer-matrixes-H into a Q matrix and an R matrix; transposing the Q matrix into $Q^T$; multiplying the $Q^T$ by the complex data vector (Y) to, thereby, providing $Y*Q^T$; feeding a Deep Neural Network with the $Y*Q^T$ and the upper part of R triangular matrix; by the neural network providing LLR values associated with the $Y*Q^T$ and the upper triangular R matrix for, thereby, detecting the $\hat{X}$.

One other exemplary embodiment of the disclosed subject matter is a system, the system comprising: a QR decomposition unit configured for receiving from a random MIMO channel a plurality of MIMO-channel-transfer-matrixes-H, each of the MIMO-channel-transfer-matrix-H being associated with a certain MIMO channel; decomposing each of the MIMO-channel-transfer-matrixes-H into a Q matrix and an R matrix; transposing the Q matrix into $Q^T$; a multiplier configured for receiving plurality of data complex data vectors (Y) each vector (Y) of the plurality of complex data vectors (Y) being associated with a MIMO-channel-transfer-matrix-H of the plurality of MIMO-channel-transfer-matrixes-H and for multiplying each of the $Q^T$ by an associated vector (Y) to thereby providing $Q^T*Y$; a deep neural network configured for being trained with a training set labeled with LLR values to, thereby, utilizing the deep neural network for detecting $\hat{X}$; the training set comprising the plurality of the $Q^T*Y$ and the associated upper triangular matrix R.

One other exemplary embodiment of the disclosed subject matter is a system, the system comprising: a QR decomposition unit configured for receiving a MIMO-channel-transfer-matrix-H, the MIMO-channel-transfer-matrix-H being associated with a certain MIMO channel; for decomposing the MIMO-channel-transfer-matrixes-H into a Q matrix and an upper triangular matrix R and for transposing the Q matrix into $Q^T$; a multiplier configured for receiving a complex data vector (Y); the complex data vector (Y) being associated with a MIMO-channel-transfer-matrix-H and for multiplying the $Q^T$ by the vector (Y) to, thereby, providing $Y*Q^T$; a Deep Neural Network configured for receiving from the QR decomposition unit the R matrix and for receiving from the multiplier the $Y*Q^T$; the Deep Neural Network being trained for providing LLR values associated with the $Y*Q^T$ and with the R matrix.

One technical problem disclosed by the present disclosure is how to reduce the complexity of MIMO AI (Artificial Intelligent) detectors. The radio signal modulation scheme, MIMO layers quantity and target performance affect the neural network size and processing complexity of MIMO AI detectors.

One technical solution is an AI MIMO detector which performs a QR decomposition preprocessing of the estimated channel matrix (H) and outputs LLR results.

According to some embodiments the AI MIMO detector is trained with pairs of $Q^T*Y$ and upper part of R such that each pair is labeled with corresponding LLRs results. The corresponding LLRs are calculated by a maximum likelihood detector or by any other near optimal algorithm.

According to some embodiments in real time the deep learning machine generates the LLR values from the received vector multiplied by $Q^T$ (Q transposed) and from the upper part of the R matrix decomposed out of the estimated channel matrix (H).

An example of a model that is used by the MIMO AI detector is FEED FORWARD model.

In one example of a 2×2 MIMO with K receiving antenna elements and an QPSK (Quadrature Phase-Shift Keying) signal the calculated deep neural network interface size without QR decomposition preprocessing is as follow:

H is a complex K*2 matrix, yielding 2*2*K real inputs
Y is a complex vector of length K, yielding 2*K real inputs
The output is 4 LLR's
While with the QR decomposition preprocessing the deep neural network processing is
Independence of K
R matrix is complex on its upper triangular matrix and with real numbers on its diagonal, yielding only 4 real inputs
$Q^T*Y$ is a complex vector of length 2, yielding 4 real inputs
The output is 4 LLR's.

This example demonstrates that with the presented solution DNN Interface size is reduced. The network Interface size is reduced, consequently reducing learning cases number. The performance of learning time is expedited, and the error rate performance is close to the error rate of the regular ML detector (about ~0.5 dB degradation) and the MIMO detector solution can be implemented using an off the shelf GPU (Graphic Processing Unit).

Embodiments of the invention may be implemented as a computer process (method), a computing system, or as an article of manufacture, such as a computer program product or a non-transitory computer-readable media. The computer program product may be a computer storage media readable by a computer system and encoding a computer program of instructions for executing a computer process on the computer and network devices. The computer program product may also be a propagated signal on a carrier readable by a computing system and encoding a computer program of instructions for executing a computer process.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
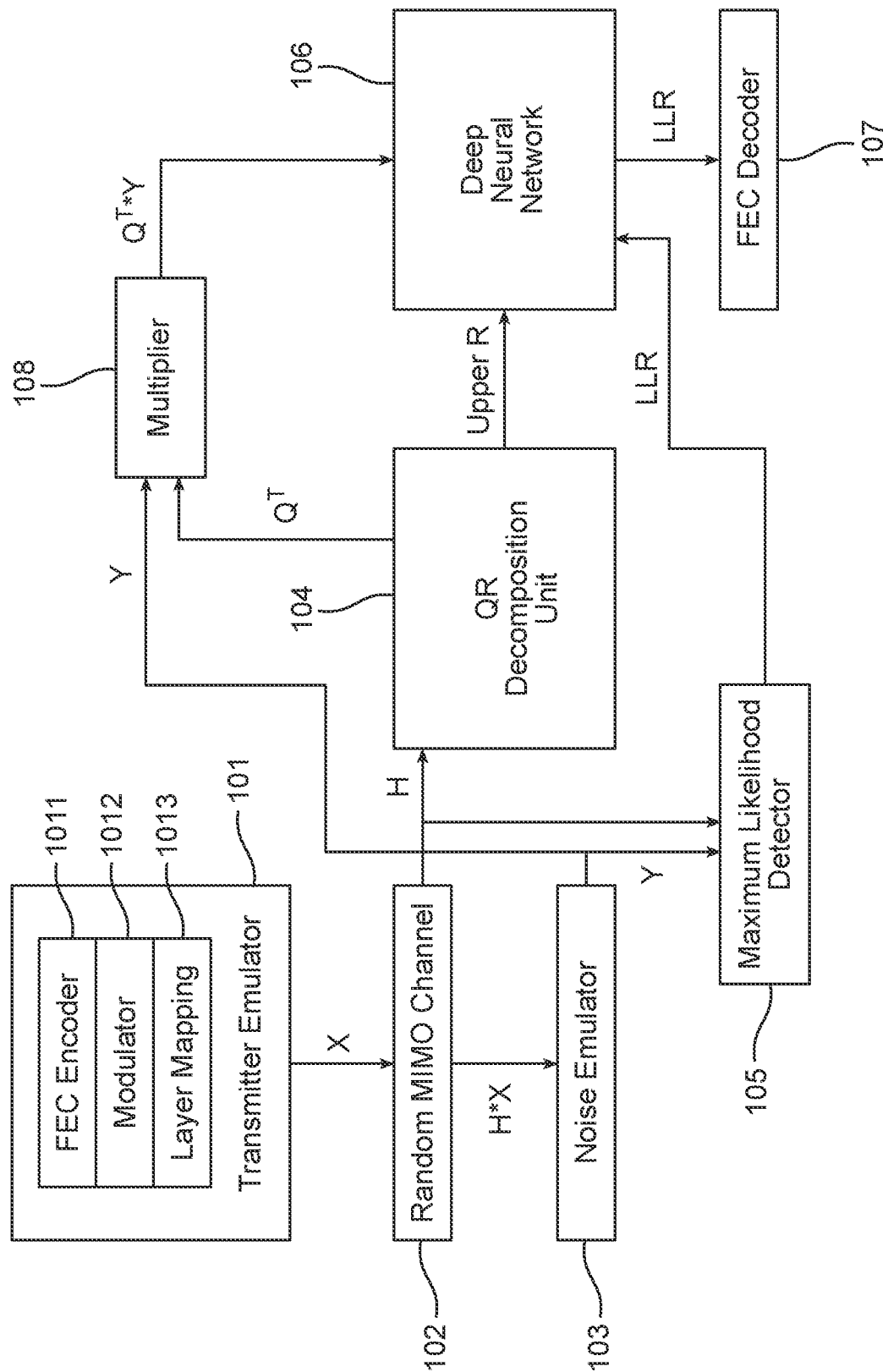
FIG. 1 shows a block diagram of an environment of the AI MIMO detector learning phase, in accordance with some exemplary embodiments of the subject matter.

FIG. 1 shows a block diagram of an environment of the AI MIMO detector learning phase, in accordance with some exemplary embodiments of the subject matter.

Environment 100 includes transmitter emulator 101, random MIMO channel generator 102, noise emulator 103, QR decomposition unit 104, maximum likelihood detector 105, deep neural network 106, Multiplier 108 and FEC decoder 107.

The transmitter emulator 101 is configured for generating the incoming data for the vectors X. The transmitter emulator 101 includes a FEC encoder 1011, modulator 1012 and layer mapping 1013.

The FEC encoder 1011 is configured for receiving simulated data and for encoding the received data. The FEC encoder operation is in accordance with the 3GPP 5G standards.

The modulator 1012 is an OFDM modulator. The modulator 1012 adheres to the 3GPP 5G standards.

The layer mapping 1013 maps the data into MIMO orthogonal layers. The layers mapping 1013 adheres to the 3GPP 5G standard.

The random MIMO channel 102 is configured for emulating a MIMO channel by generating the H matrix. The H matrix is generated using a normal distribution random generator.

The noise emulator 103 is configured for emulating the channel noise "n" and for generating the complex data vector (Y).

The QR decomposition unit 104 is configured for the QR decomposition of the H matrix into Q and transposing the Q matrix into $Q^T$ (Q Transpose) and an upper (non-zero elements) triangular matrix R.

The Multiplier 108 is configured for multiplying $Q^T$ with Y and for transferring the $Q^T*Y$ and upper R to the deep neural network 106.

The maximum likelihood detector 105 is configured for processing the LLR results from the H and Y. The LLR results are used for training the deep neural network 106.

In some embodiments (not shown in the figure) the maximum likelihood detector 105 generates the LLR results from the upper R and $Q^T*Y$.

The deep neural network 106 is configured for receiving the pair of upper R and $Q^{T*}Y$ labeled with LLR results and for changing connectivity and weight of its neurons accordingly Data Flow:

The transmitter emulator 101 generates the data vector X. The transmitter emulator 101 outputs the vector X to the random MIMO channel 102 for emulating a radio channel by generating the H matrix for the channel.

The MIMO channel 102 generates randomly the matrix H. The random MIMO channel 102 receives the vector X from the transmitter emulator 101 and multiplies it with H.

The random MIMO channel generator 102 feeds the matrix H to the QR decomposition unit 104 and to the maximum likelihood detector 105.

The random MIMO channel 102 outputs the X*H product to the noise emulator 103.

The noise emulator 103 receives H*X from the random MIMO channel generator 102 adds noise and outputs the outcome complex data vector Y to the QR decomposition unit and to the maximum likelihood detector 105.

The maximum likelihood detector 105 receives the H matrix from the random MIMO channel generator 102 and receives the corresponding complex data vector (Y) from the noise emulator 103. The maximum likelihood detector 105 estimates the LLR values from the input and outputs the values to the Deep Neural Network 106 for training the Deep Neural Network 106.

In should be noted that in some embodiments (not shown in the figure) the maximum likelihood detector 105 generates the LLR results from the upper R and Q transpose*Y.

The QR decomposition unit 104 receives the H matrix from the random MIMO channel generator 102 and outputs the upper R matrix part to the Deep Neural Network 106 The QR decomposition unit 104 outputs the transposed Q ($Q^T$) to the Multiplier 108.

The Multiplier 108 receives the $Q^T$ from the QR decomposition unit 104. The Multiplier 108 receives the complex data vector (Y) from the Noise Emulator 103. The Multiplier 108 outputs the $Q^{T*}Y$ to the Deep Neural Network 106.

The Deep Neural Network 106 receives the $Q^{T*}Y$ of and the upper triangular matrix R from the QR decomposition unit 104. The Deep Neural Network 106 receives the LLR values corresponding to the input from the maximum likelihood detector 105. The Deep Neural Network 106 changes the connectivity between its neurons and/or the weight of the neurons accordingly In some embodiments the FEC decoder 107 decodes the received data $\hat{X}$ from the LLR values and feeds the detected data to compare with DNN detected values so as to verify the performance.

Figure 2:
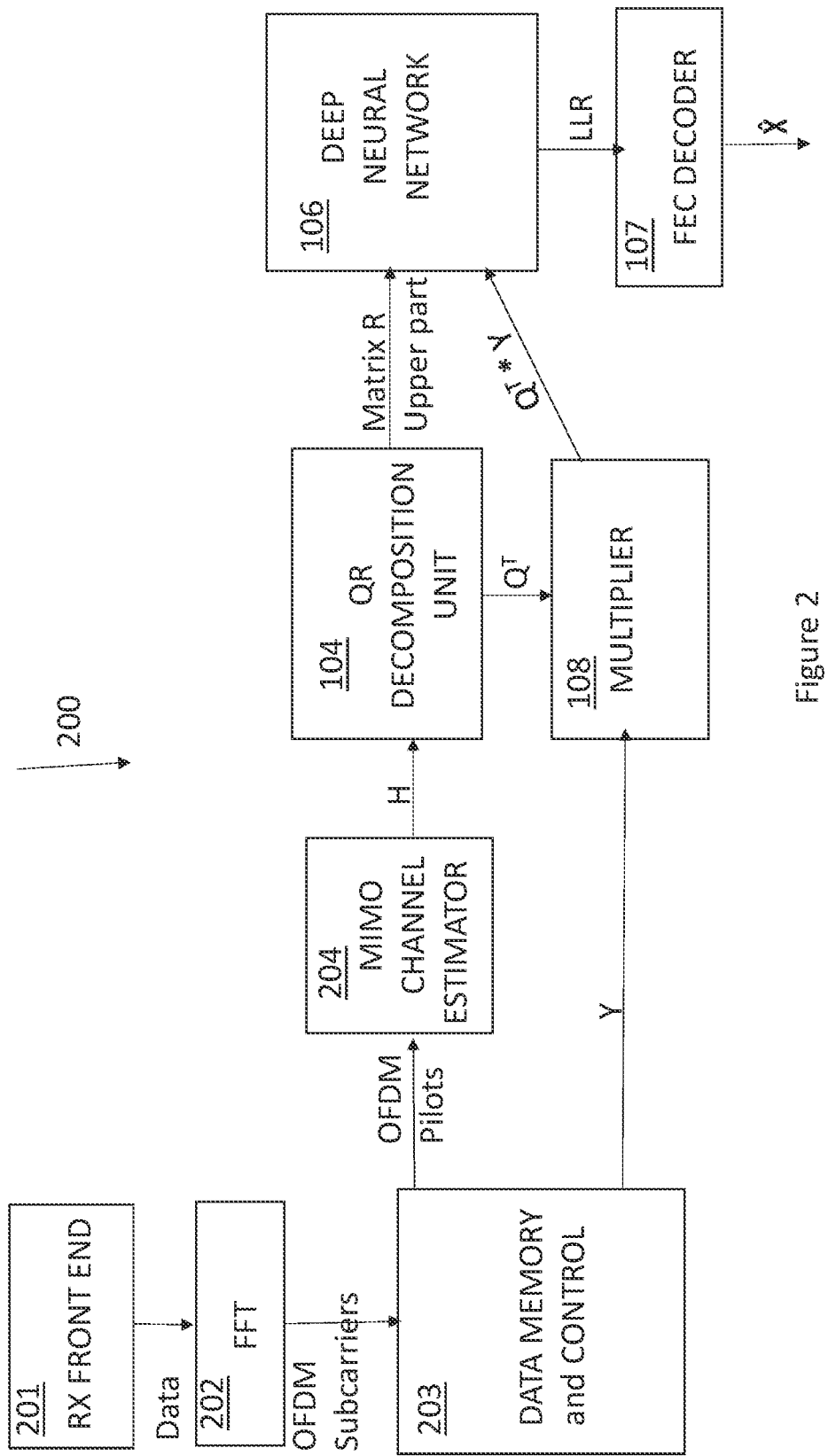
FIG. 2 shows a block diagram of an environment of the AI MIMO detector in real time operating phase, in accordance with some exemplary embodiments of the subject matter.

FIG. 2 shows a block diagram of an environment of the AI MIMO detector in operating phase, in accordance with some exemplary embodiments of the subject matter.

Environment 200 includes RX front end 201, FFT 202, Data memory 203, MIMO channel estimator 204, QR decomposition unit 104, deep neural network 106, A Multiplier 108 and FEC decoder 107.

The RX front end 201 is configured for receiving signals from the MIMO antennae (not shown in the figure). The RX front end 201 adheres to the 3GPP 5G standard.

The FFT 202 is configured for performing the Fast Fourier Transform (FFT) on the received signals (after sampling and digitization).

The data memory and control 203 is configured for storing the digitized OFDM subcarriers data and for identifying OFDM pilots and the Y vector components out of the OFDM subcarriers.

The MIMO channel estimator 204 is configured for setting the estimated MIMO channel H matrix. The MIMO channel estimator 204 adheres to the 3GPP 5G standards.

The QR decomposition unit 104 is configured for the performing QR decomposition of the estimated H matrix into Q and R matrixes and transposing the Q matrix into $Q^T$ and for selecting the upper R matrix part.

The Multiplier 108 is configured for multiplying the complex data vector (Y) by $Q^T$.

The Deep Neural network 106 is configured for receiving as inputs $Y*Q^T$ and upper part of the R matrix. The Deep Neural network 106 is further configured for outputting LLR results related to the received data.

The FEC decoder 107 decodes the estimated received data $\hat{X}$ from the LLR values.

In some embodiments a validation process is performed. In such a case the FEC decoder 207 decodes the LLR values that are generated by a maximum likelihood detector (not shown in the figure) and further decodes the LLR values that are generated by the deep neural network 106 and compares the values in order to evaluate the performance of the deep neural network 106.

Data Flow:

The RX front end 201 outputs the received data to the FFT 202.

The FFT 202 performs Fast Fourier Transform (FFT) over the incoming digital signal and outputs the OFDM subcarriers to the Data memory and control 203.

The Data memory and control 203 identifies the complex data vectors (Y) components and the OFDM pilots in the stored OFDM subcarriers.

The MIMO channel estimator 204 fetches the OFDM pilots from the data memory and control 203. The MIMO channel estimator 204 generates the estimated H matrix and outputs the H matrix to the QR decomposition unit 104.

The QR decomposition unit 104 receives the H matrix from the MIMO channel estimator 204. The QR decomposition unit 104 performs the decomposition of H into Q and R. The QR decomposition unit 104 outputs the Upper R part to the Deep Neural Network 106 and the transposed Q ($Q^T$) to the multiplier 108

The multiplier 108 receives the $Q^T$ matrix from the QR decomposition unit 104 and the complex data vector (Y) from the Data memory and control 203. The multiplier 108 multiplies the $Q^T$ by Y and outputs the product to the deep neural network 106.

The deep neural network 106 receives the upper part of the R matrix from the QR decomposition unit 104. The deep neural network 106 receives $Q^{T*}Y$ from the multiplier 108. The deep neural network 106 outputs the received data LLR values to the FEC decoder 107.

The FEC decoder 107 receives the LLR values from the DNN and outputs the detected data vector $\hat{X}$.

Figure 3:
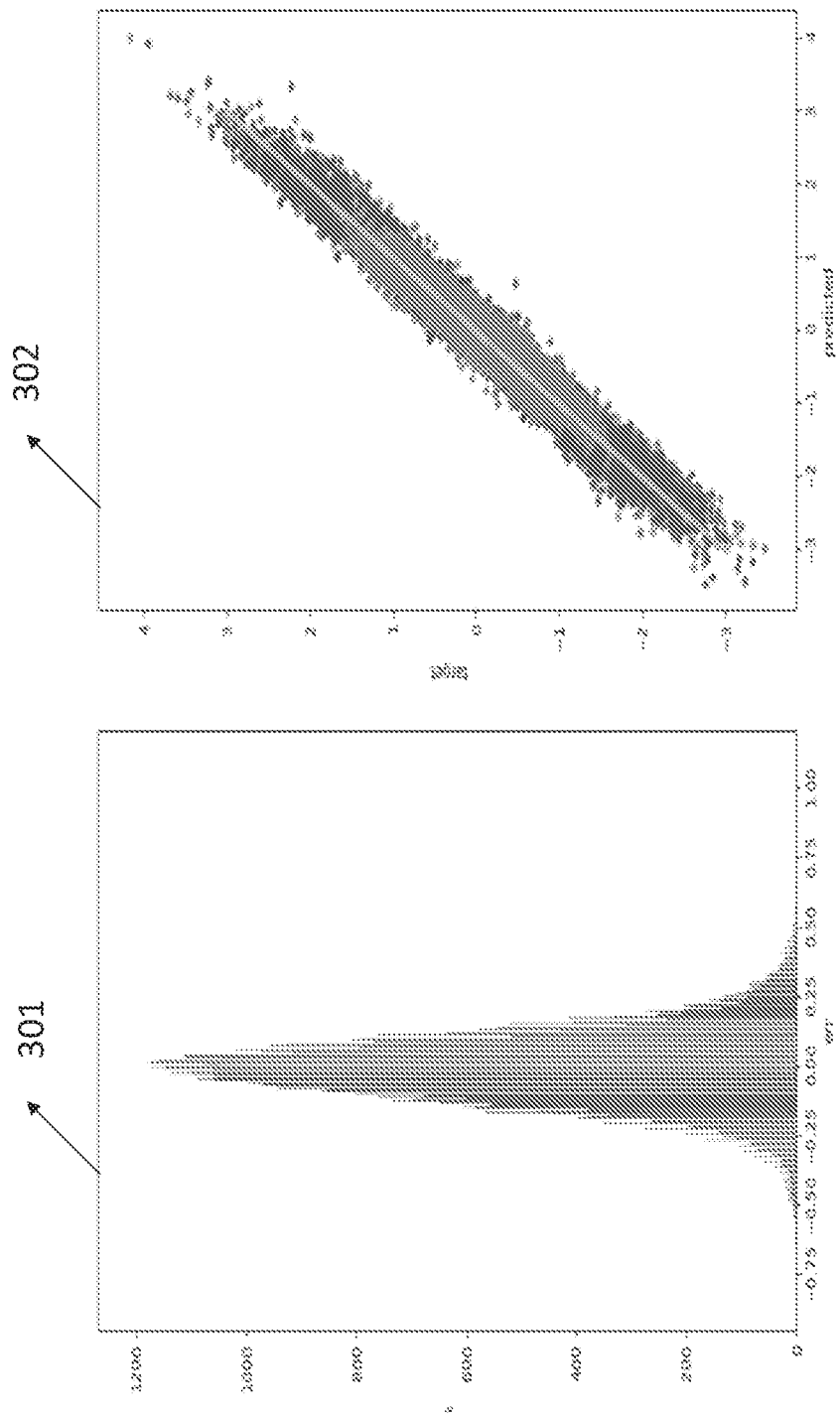
FIG. 3 depicts a graph of the results of the AI MIMO detector learning phase comparing to real values, in accordance with some exemplary embodiments of the subject matter.

FIG. 3 depicts a graph of the results of the AI MIMO detector learning phase compared with real values, in accordance with some exemplary embodiments of the subject matter.

Graph 301 illustrates the deviation from the expected X values. The horizontal axis is the deviation, and the orthogonal axis is the number of errors in this deviation. Graph 302 illustrates the deviation of the results from the real values.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

What is claimed is:

1. A method for detecting transmitted data by a deep neural network, the method comprising:
receiving a plurality of complex data vectors (Y) and a plurality of MIMO-channel-transfer-matrixes-H, each complex data vector (Y) of said plurality of complex data vectors (Y) being associated with a MIMO-channel-transfer-matrix-H of said plurality of MIMO-channel-transfer-matrixes-H, each said MIMO-channel-transfer-matrix-H being associated with a certain Multiple Input Multiple Output (MIMO) channel;
decomposing each of said MIMO-channel-transfer-matrixes-H into a Q matrix and an R matrix;
transposing said Q matrix into $Q^T$;
multiplying each of said $Q^T$ by an associated vector (Y) to thereby providing $Q^T*Y$;
training said deep neural network with a training set labeled with Log-Likelihood Ratio values; said training set comprising said plurality of said $Q^T*Y$ and an upper part of said R matrix; and
utilizing said deep neural network for receiving second Log-Likelihood Ratio values from a second complex data vector (Y) and a second associated MIMO-channel-transfer-matrix-H and for detecting $\hat{X}$ from said second Log-Likelihood Ratio values; said $\hat{X}$ being a detected data vector detecting said transmitted data.

2. The method of claim 1, wherein each of said Log-Likelihood Ratio values being generated by a Maximum Likelihood detector.

3. The method of claim 1, wherein said second Log-Likelihood Ratio values being utilized for said detecting said $\hat{X}$.

4. A method, the method comprising:
receiving a complex data vector (Y) and a MIMO-channel-transfer-matrix-H, said complex data vector (Y) being associated with a MIMO-channel-transfer-matrix-H, said MIMO-channel-transfer-matrix-H being associated with a certain Multiple Input Multiple Output (MIMO) channel; said complex data vector (Y) comprises transmitted data as received via said Multiple Input Multiple Output (MIMO) channel;
decomposing said MIMO-channel-transfer-matrixes-H into a Q matrix and an R matrix;
transposing said Q matrix into $Q^T$;
multiplying said $Q^T$ by said complex data vector (Y) to, thereby, providing $Y \cdot Q^T$;
feeding a Deep Neural Network with said $Y \cdot Q^T$ and an upper part of said R matrix;
by said Deep Neural Network providing Log-Likelihood Ratio values associated with said $Y \cdot Q^T$ and said upper triangular R matrix; and
transmitting said Log-Likelihood Ratio values to a Forward Error Correction (FEC) decoder for detecting $\hat{X}$ from said Log-Likelihood Ratio; said $\hat{X}$ being a detected data vector estimating said transmitted data.

5. A method for detecting transmitted data by a mix of building blocks that one building block is deep neural network, the method comprising:
receiving a plurality of complex data vectors (Y) and a plurality of MIMO-channel-transfer-matrixes-H, each complex data vector (Y) of said plurality of complex data vectors (Y) being associated with a MIMO-channel-transfer-matrix-H of said plurality of MIMO-channel-transfer-matrixes-H, each said MIMO-channel-transfer-matrix-H being associated with a certain Multiple Input Multiple Output (MIMO) channel;
decomposing each of said MIMO-channel-transfer-matrixes-H into a Q matrix and an R matrix;
transposing said Q matrix into $Q^T$;
multiplying each of said $Q^T$ by an associated vector (Y) to thereby providing $Q^T*Y$;
training said deep neural network with a training set labeled with Log-Likelihood Ratio values; said training set comprising said plurality of said $Q^T*Y$ and an upper part of said R matrix; and
utilizing said deep neural network for receiving second Log-Likelihood Ratio values from a second complex data vector (Y) and a second associated MIMO-channel-transfer-matrix-H and for detecting $\hat{X}$ from said second Log-Likelihood Ratio values; said $\hat{X}$ being a detected data vector detecting said transmitted data.

* * * * *